US012726709B2

(12) United States Patent
Liao et al.

(10) Patent No.: US 12,726,709 B2
(45) Date of Patent: Sep. 1, 2026

(54) PHOTOGRAPHIC SYSTEM AND OPERATION METHOD THEREOF

(71) Applicant: InnoLux Corporation, Miao-Li County (TW)

(72) Inventors: Chien-Chih Liao, Miao-Li County (TW); Hsing-Yuan Hsu, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 260 days.

(21) Appl. No.: 18/584,174

(22) Filed: Feb. 22, 2024

(65) Prior Publication Data

US 2024/0334061 A1 Oct. 3, 2024

Related U.S. Application Data

(60) Provisional application No. 63/493,326, filed on Mar. 31, 2023.

(30) Foreign Application Priority Data

Dec. 18, 2023 (CN) ......................... 202311755754.3

(51) Int. Cl.

| | |
|---|---|
| ***H04N 23/695*** | (2023.01) |
| ***H04N 23/11*** | (2023.01) |
| ***H04N 23/13*** | (2023.01) |
| ***H04N 23/667*** | (2023.01) |
| ***H04N 23/71*** | (2023.01) |
| *H04N 23/51* | (2023.01) |

(52) U.S. Cl.

CPC ........... *H04N 23/695* (2023.01); *H04N 23/11* (2023.01); *H04N 23/13* (2023.01); *H04N 23/667* (2023.01); *H04N 23/71* (2023.01); *H04N 23/51* (2023.01)

(58) Field of Classification Search

CPC .... H04N 23/695; H04N 23/667; H04N 23/69; H04N 7/181; H04N 25/21

See application file for complete search history.

(56) References Cited

U.S. PATENT DOCUMENTS

| | | | | |
|---|---|---|---|---|
| 10,931,889 | B1 * | 2/2021 | Barone | H04N 23/695 |
| 2005/0012843 | A1 * | 1/2005 | Kuwakino | H04N 23/20 348/335 |

(Continued)

FOREIGN PATENT DOCUMENTS

| | | | |
|---|---|---|---|
| TW | 201033725 | A | 9/2010 |

*Primary Examiner* — Kathleen V Nguyen

(74) *Attorney, Agent, or Firm* — McClure, Qualey & Rodack, LLP

(57) ABSTRACT

A photographic system for photographing a warm-blooded animal in a background is provided, including an infrared sensor, a host, and a camera module. The infrared sensor is configured to identify the position of the warm-blooded animal in the background, and generate position data according to the position. The host is coupled to the infrared sensor, and configured to receive the position data and generate at least one parameter according to the position data. The camera module is coupled to the host, and includes a camera and a controller. The controller is configured to receive the parameter and adjust the photographing direction of the camera according to the parameter.

4 Claims, 7 Drawing Sheets

(56) References Cited

U.S. PATENT DOCUMENTS

| | | | | |
|---|---|---|---|---|
| 2006/0197840 | A1* | 9/2006 | Neal | G01S 3/7864<br>348/169 |
| 2016/0330403 | A1* | 11/2016 | Siminoff | H04N 23/57 |
| 2017/0180635 | A1* | 6/2017 | Hayashi | H04N 23/50 |
| 2018/0040109 | A1* | 2/2018 | Hayashi | G02B 26/007 |
| 2021/0216786 | A1* | 7/2021 | Machida | H04N 23/62 |
| 2021/0342648 | A1* | 11/2021 | Richards | G06V 10/143 |
| 2022/0114712 | A1* | 4/2022 | Wu | G06T 5/50 |

* cited by examiner

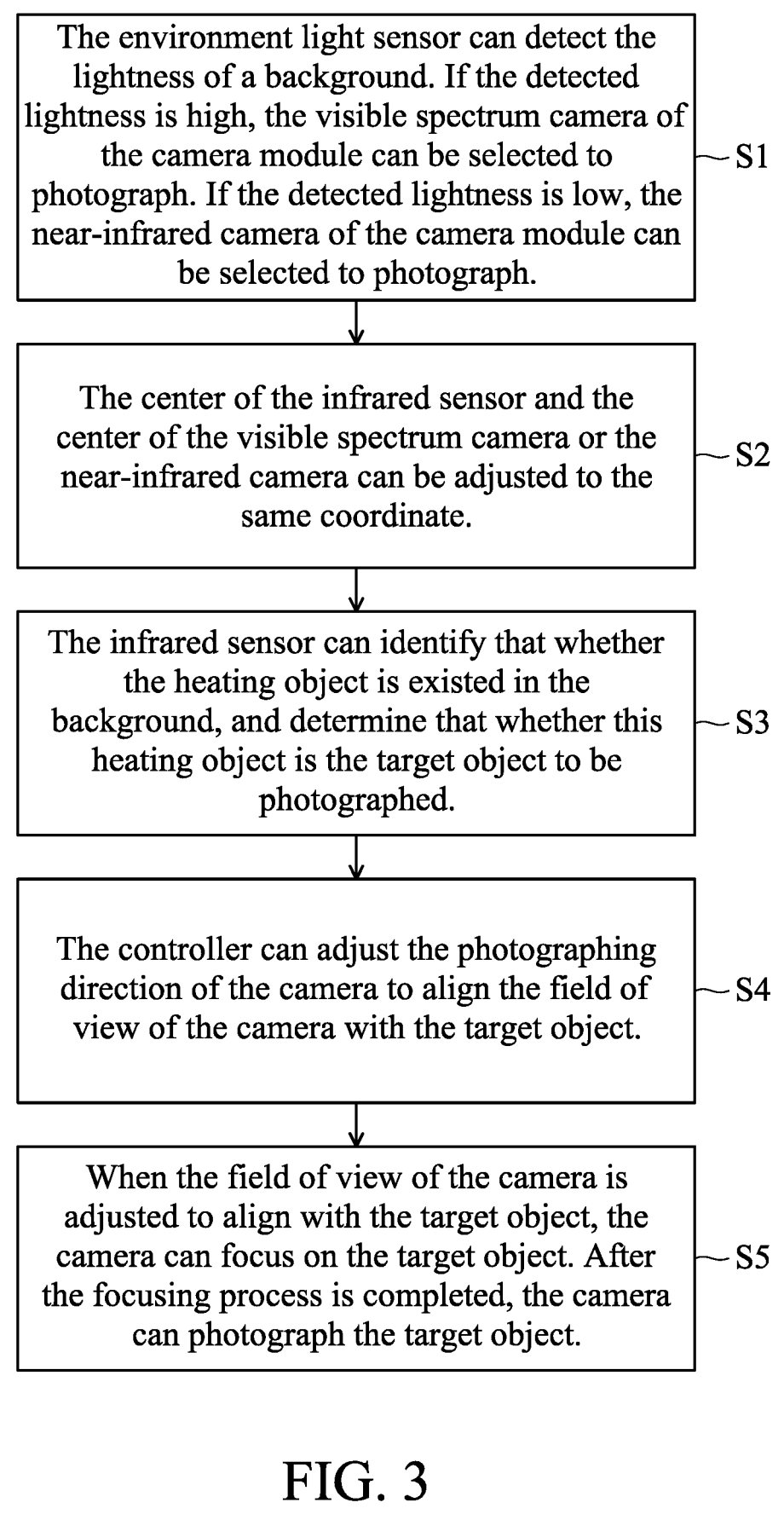

The environment light sensor can detect the lightness of a background. If the detected lightness is high, the visible spectrum camera of the camera module can be selected to photograph. If the detected lightness is low, the near-infrared camera of the camera module can be selected to photograph. — S1

↓

The center of the infrared sensor and the center of the visible spectrum camera or the near-infrared camera can be adjusted to the same coordinate. — S2

↓

The infrared sensor can identify that whether the heating object is existed in the background, and determine that whether this heating object is the target object to be photographed. — S3

↓

The controller can adjust the photographing direction of the camera to align the field of view of the camera with the target object. — S4

↓

When the field of view of the camera is adjusted to align with the target object, the camera can focus on the target object. After the focusing process is completed, the camera can photograph the target object. — S5

FIG. 3

PHOTOGRAPHIC SYSTEM AND OPERATION METHOD THEREOF

CROSS REFERENCE TO RELATED APPLICATIONS

This application claims the benefit of U.S. Provisional Application No. 63/493,326, filed Mar. 31, 2023, and China Patent Application No. 202311755754.3, filed Dec. 18, 2023, the entirety of which are incorporated by reference herein.

BACKGROUND OF THE DISCLOSURE

Field of the Disclosure

The application relates in general to a photographic system, and in particular, to a photographic system for photographing a warm-blooded animal.

Description of the Related Art

The photography is an application of recording the light to generate an image. In recent years, as the dimensions of the camera gradually decreased, the photography of the wildlife animal becomes popular. When photographing the wildlife animal in an outdoor environment, it is difficult to find and focus the wildlife animal due to the dim light or the shield of the foreign object. Therefore, how to address the aforementioned problem has become an important issue.

BRIEF SUMMARY OF DISCLOSURE

An embodiment of the disclosure provides a photographic system for photographing a warm-blooded animal in a background. The photographic system includes an infrared sensor, a host, and a camera module. The infrared sensor is configured to identify the position of the warm-blooded animal in the background, and generate position data according to the position. The host is coupled to the infrared sensor, and configured to receive the position data and generate at least one parameter according to the position data. The camera module is coupled to the host, and includes a camera and a controller. The controller is configured to receive the parameter and adjust the photographing direction of the camera according to the parameter.

An embodiment of the disclosure also provides an operation method of a photographic system. The operation method includes providing the photographic system, wherein the photographic system comprises an infrared sensor, a host, and a camera module, and the host is coupled to the infrared sensor and the camera module. The operation method includes using the infrared sensor to identify that whether a heating object is existed in a background. The operation method includes using the infrared sensor to determine that whether the heating object is a target object to be photographed. The operation method includes using the infrared sensor to generate position data when the target object is in the background and transmit the position data to the host. The operation method includes using the host to generate at least one parameter according to the position data, and to transmit the at least one parameter to the controller of the camera module. The operation method includes using the controller to adjust the camera in the camera module to align its field of view to the target object. The operation method includes using the camera to focus and then to take a photograph.

BRIEF DESCRIPTION OF DRAWINGS

The disclosure can be more fully understood by reading the subsequent detailed description and examples with references made to the accompanying drawings, wherein:

FIG. 3 is a flowchart diagram of the photographing using the photographic system according to an embodiment of the disclosure;

DETAILED DESCRIPTION OF DISCLOSURE

Figure 1:
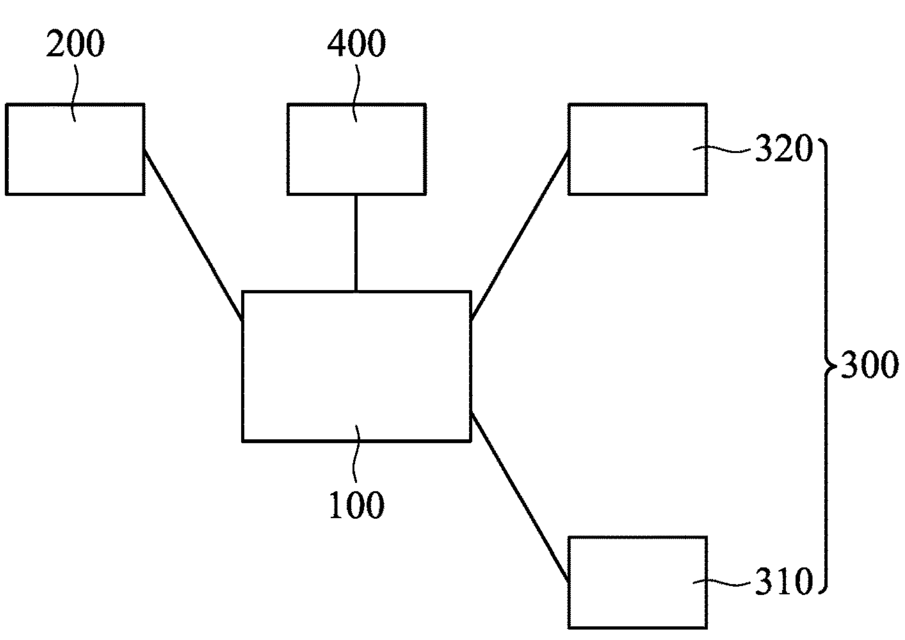
FIG. 1 is a schematic diagram of a photographic system according to an embodiment of the disclosure.

The making and using of the embodiments of the photographic system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of the present disclosure, the corresponding features, areas, steps, operations and/or components would be pointed to existence, but not limited to the existence of one or a plurality of the corresponding features, areas, steps, operations and/or components.

In addition, in this specification, relative expressions are used. For example, "below" and "above" are used to describe the position of one element relative to another. It should be appreciated that if a device is flipped upside down, an element that is "below" will become an element that is "above".

When the corresponding component (such as layer or area) is referred to "on another component (or the variant thereof)", it may be directly on another component, or other component may exist between them. On the other hand, when the component is referred to "directly on another component (or the variant thereof)", any component does not exist between them. Moreover, when a component is referred to "on another component (or the variant thereof)", the component and the other component has a positional relationship from a top view, the component can be disposed above or below the other component, and the positional relationship is based on the orientation of the device.

In some embodiments of the disclosure, terms concerning attachments, coupling and the like, such as "connected", refer to a relationship wherein structures are secured or attached to one another either directly or indirectly through intervening structures, unless expressly described otherwise.

It should be understood that, although the terms "first", "second", etc. can be used herein to describe various elements, layers and/or sections, these elements, layers and/or sections should not be limited by these terms. These terms are only used to distinguish one element layer or section from another element, layer or section. Thus, a first element, layer or section discussed below could be termed a second element, layer or section without departing from the teachings of the present disclosure. For brevity, the terms "first", "second", etc. may not be used in the specification. The first element and/or the second element in claims can refer to any element that meets the description in the specification without departing from the spirit and scope of the invention as defined by the appended claims.

The terms "about" and "substantially" typically mean +/−15% of the stated value, for example, +/−10%, +/−5%, +/−3%, +/−2%, +/−1%, or +/−0.5% of the stated value. The stated value of the present disclosure is an approximate value. When there is no specific description to the terms "about" and "substantially", the stated value includes the meaning of "about" or "substantially". Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise. Moreover, for brevity, some elements can be suitably omitted in the figures.

Referring to FIG. 1, a photographic system S in an embodiment of the disclosure primarily includes a host 100, an infrared sensor 200, a camera module 300, and an environment light sensor 400. The host 100 can be a computing member. For example, the host 100 can include a processor (such as a central processing unit (CPU) or a graphics processing unit (GPU)), a chipset, and/or a memory (such as a read only memory (ROM), a flash memory, a random access memory (RAM)), but it is not limited thereto. The host 100 can be coupled to (be electrically connected to) the infrared sensor 200, the camera module 300, and the environment light sensor 400, so that the host 100 can receive the signal from and/or control the aforementioned members.

The infrared sensor 200 can include a long wave infrared (LWIR) sensor or a long wave infrared camera, and can detect the infrared radiation having the wavelength ranged between 8 micrometers (μm) to 14 micrometers to identify the object generating the heat in the predetermined region. In another embodiment, the infrared sensor 200 includes a medium wavelength infrared (MWIR) sensor or a short wavelength infrared (SWIR) sensor.

The camera module 300 includes a camera 310 which includes one or more lenses and one or more image sensors. The external light can pass through the lens and form the image on the image sensor. For example, the camera 310 can include a visible spectrum camera and/or a near-infrared camera (NIR camera). When the light in the environment around the photographic system S is sufficient, the camera 310 can include the visible spectrum camera to obtain the image with color. When the light in the environment around the photographic system S is insufficient, the camera 310 can include the near-infrared camera to obtain the black and white image having high contract.

Figure 2:
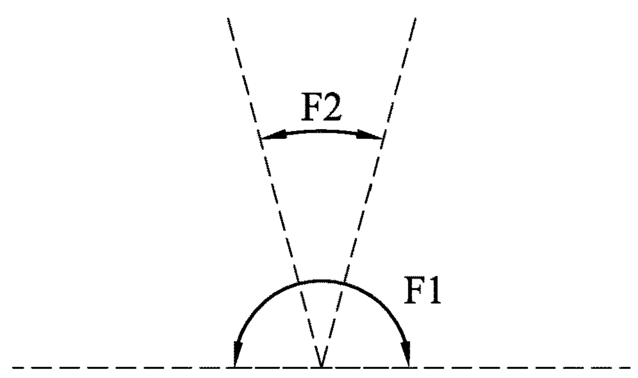
FIG. 2 is a schematic diagram of the field of the view of the infrared sensor and the field of view of the camera module according to an embodiment of the disclosure.

It should be noted that, as shown in FIG. 2, the field of view (FOV) F1 of the infrared sensor 200 is greater than the field of view F2 of the camera 310. The field of view F1 of the infrared sensor 200 can be greater than 160 degrees and less than 200 degrees. For example, the field of view F1 of the infrared sensor 200 substantially can be 180 degrees. The field of view F2 of the camera 310 can be greater than 0 degrees and less than 50 degrees. For example, the field of view F2 of the camera 310 substantially can be 30 degrees (when the visible spectrum camera is used) or less than 30 degrees (when the near-infrared camera is used).

Referring to FIG. 1, the camera module 300 can further includes a controller 320 coupled to (electrically connected to) the host 100. The controller 320 can be connected to the camera 310 to drive the camera 310 to move (such as rotate or shift), so as to adjust the position of the field of view F2 of the camera 310. For example, the controller 320 can includes a gear, a motor, a rotary disc, and/or a hinge, but it is not limited thereto.

The environment light sensor 400 can detect the illuminance of the light in the environment around the photographic system S. In particular, the environment light sensor 400 detects the illuminance of the light at the photographing direction. For example, when the environment light sensor 400 detects the illuminance of the light exceeds or is the same as 100 lux, it can be determined that the light in the environment around the photographic system S is sufficient. When the environment light sensor 400 detects the illuminance of the light is less than 100 lux, it can be determined that the light in the environment around the photographic system S is insufficient.

Referring to FIG. 1 to FIG. 4D, when the photographic system S is in use, the environment light sensor 400 can firstly detect the lightness in a background B. If the lightness is high, the host 100 can select the visible spectrum camera of the camera module 300 to photograph. If the lightness is low, the host 100 can select the near-infrared camera of the camera module 300 to photograph (step S1).

Figure 4A:
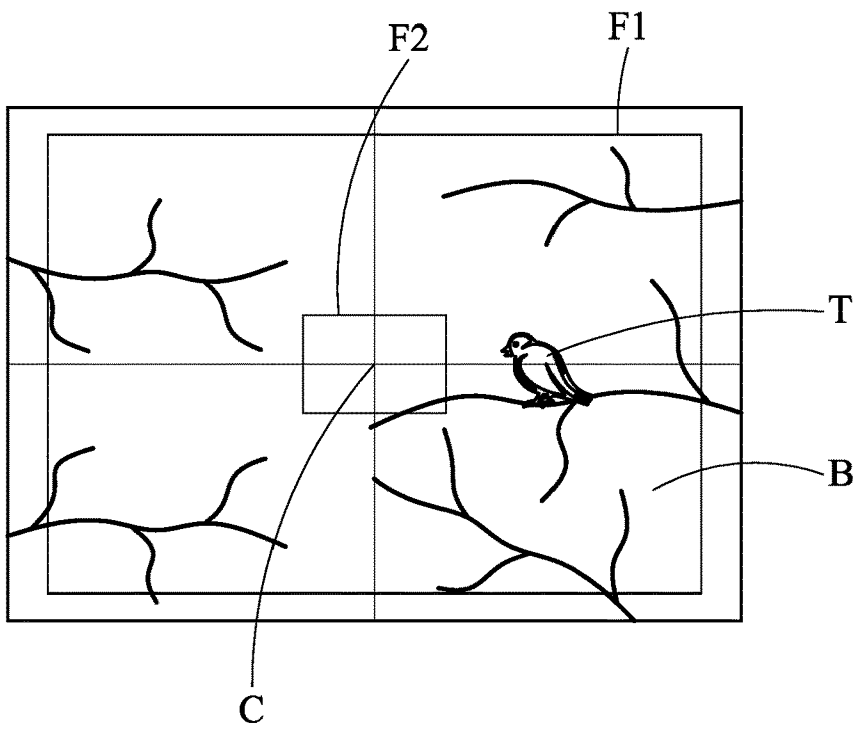
FIG. 4A is a schematic diagram represents that the center of the infrared sensor and the center of the visible spectrum camera or the near-infrared camera are adjusted to the same coordinate according to an embodiment of the disclosure.
Figure 4B:
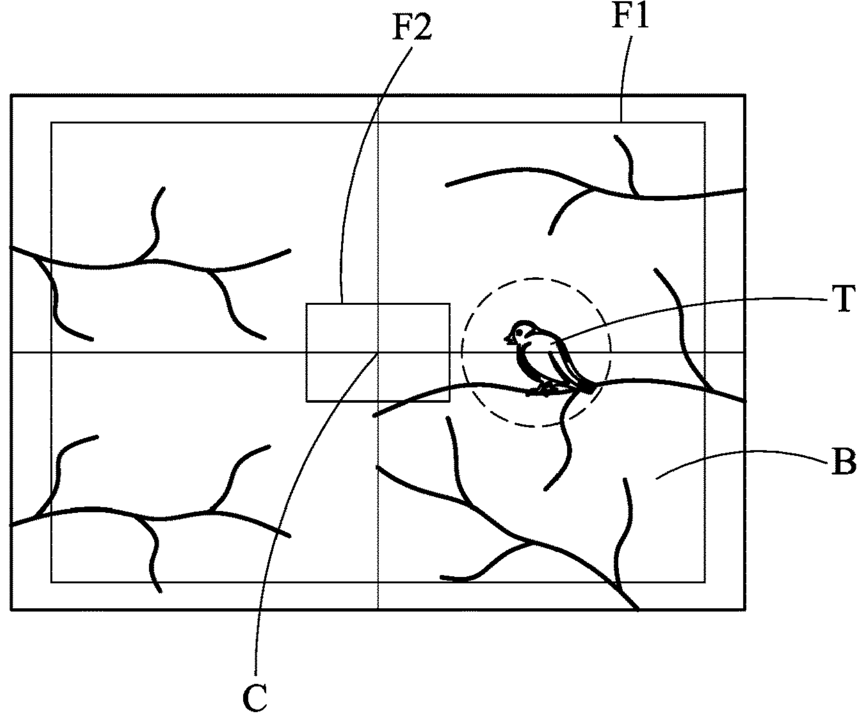
FIG. 4B is a schematic diagram represents that the infrared sensor identifies the target object in the background according to an embodiment of the disclosure.

Next, as shown in FIG. 4A, the center of the infrared sensor 200 and the center of the visible spectrum camera or the near-infrared camera can be adjusted to the same coordinate C (step S2). Therefore, the field of view F2 of the camera module 300 can be located at the central position of the field of view F1 of the infrared sensor 200.

Subsequently, as shown in FIG. 4, the infrared sensor 200 can identify that whether the heating object is existed in the background B, and determine that whether this heating object is the target object to be photographed (such as the warm-blooded animal T) (step S3). If the infrared sensor 200 identifies the position of the target object in the background B, it can generate position data according to the aforementioned position and transmit this position data to the host 100.

Figure 4C:
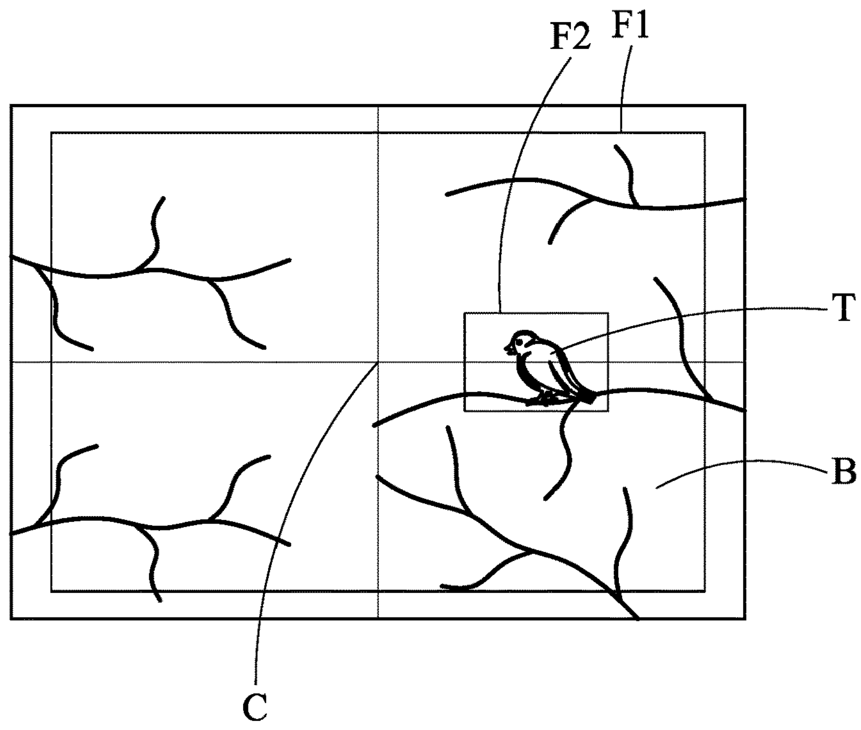
FIG. 4C is a schematic diagram represents that the field of the view of the camera is aligned with the target object according to an embodiment of the disclosure.

As shown in FIG. 4C, after the host 100 receives the position data, it can generate at least one parameter according to the position data and transmit the parameter to the controller 320. The controller 320 can adjust the photographing direction of the camera 310 according to the parameter to align the field of view F2 of the camera 310 with the target object (step S4). For example, the parameter can include the orientation angle, the elevation angle, the dip angle, or a combination thereof, but it is not limited thereto.

Figure 4D:
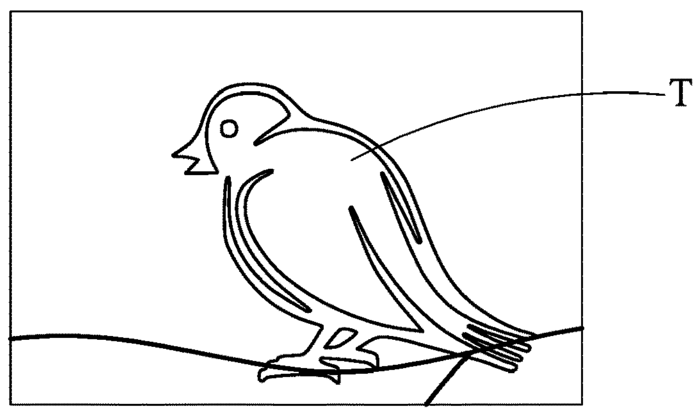
FIG. 4D is a schematic diagram represents that the camera photographs the target object according to an embodiment of the disclosure.

Finally, as shown in FIG. 4D, when the field of view F2 of the camera 310 is adjusted to align with the target object, the camera 310 can focus on the target object. After the focusing process is completed, the camera 310 can photograph the target object (step S5).

It should be noted that, if the infrared sensor 200 identify that there are multiple target objects in the background B, the infrared sensor 200 can transmit the position data of all target objects to the host 100, the user can choose one of multiple target objects to photograph through the host 100. Otherwise, the host 100 can automatically choose according to the distance between the target object and the photographic system S and/or the exposing ratio of the target object, but it is not limited thereto.

Figure 5A:
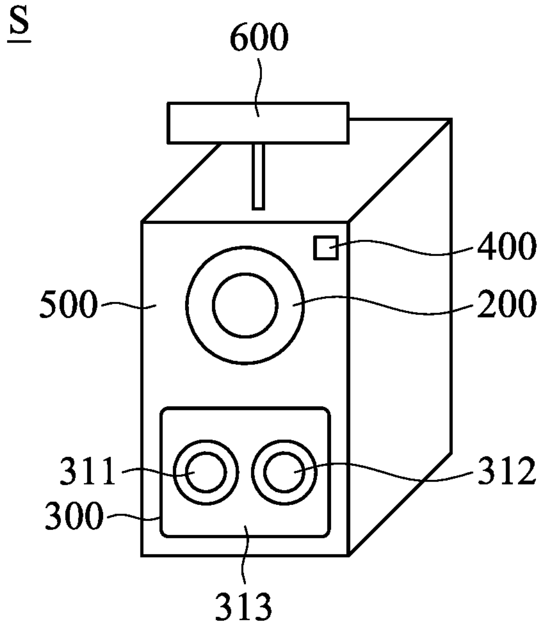
FIG. 5A is a schematic diagram of the photographic system according to an embodiment of the disclosure.
Figure 5B:
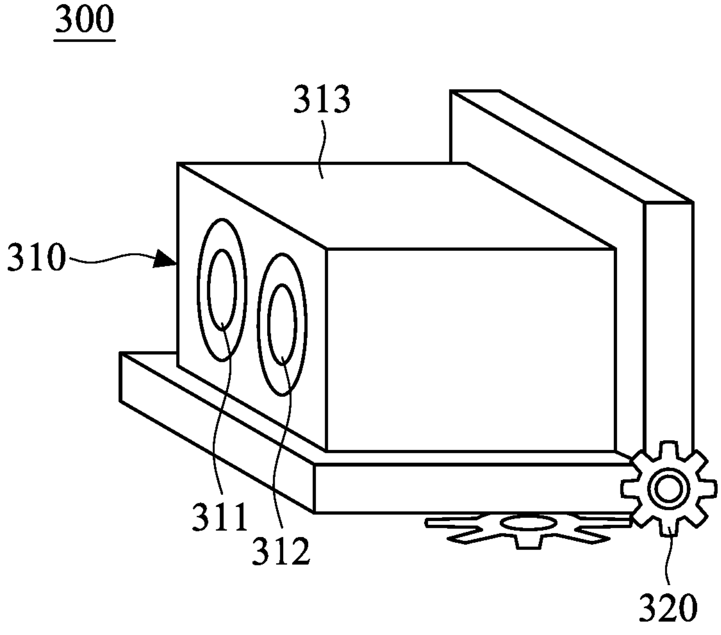
FIG. 5B is a schematic diagram of the camera module according to an embodiment of the disclosure.

FIG. 5A is a schematic diagram of the photographic system S according to an embodiment of the disclosure, and FIG. 5B is a schematic diagram of the camera module 300 of the photographic system S in FIG. 5A. As shown in FIG. 5A and FIG. 5B, in this embodiment, the host 100, the infrared sensor 200, the camera module 300, and the environment light sensor 400 are disposed in a first housing 500, the camera 310 includes a visible spectrum camera 311 and a near-infrared camera 312, and the visible spectrum camera 311 and the near-infrared camera 312 are disposed in a second housing 313. The camera 310 is disposed on the controller 320. The controller 320 can drive the second housing 313 of the camera 310 to move (such as rotate or shift), so that the visible spectrum camera 311 and the near-infrared camera 312 in the second housing 313 can be driven to move to adjust the photographing direction of the camera 310. Since the second housing 313 is disposed in the first housing 500 and the second housing 313 is driven by the controller 320, the camera 310 and the infrared sensor 200 can be simultaneously move when the controller 320 adjust the photographing direction of the camera 310. In another embodiment, the infrared sensor 200 and the camera module 300 are disposed in different housings that are enabled to move independently and do not interfered with each other. Thus, when the controller 320 adjusts the photographing direction of the camera 310, the camera 310 moves relative to the infrared sensor 200.

Furthermore, in this embodiment, the photographic system S further includes a flash 600 disposed on the first housing 500 and electrically connected to the host 100. The host 100 can determine that whether the flash 600 is open according to the light detected by the environment light sensor 400 and the position of the target object.

Figure 6A:
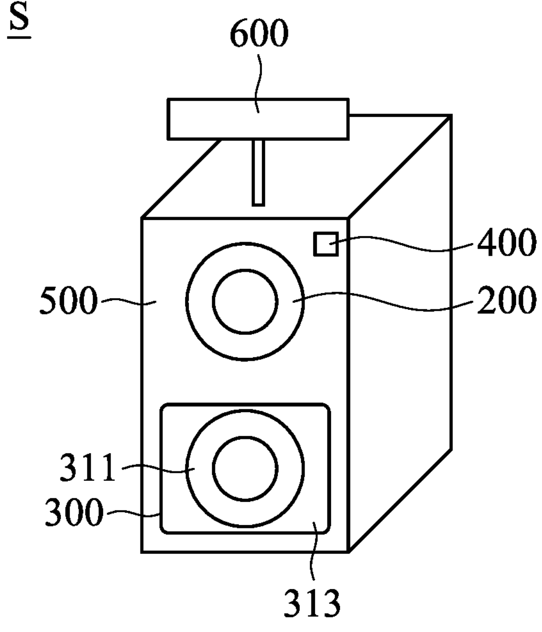
FIG. 6A is a schematic diagram of the photographic system according to another embodiment of the disclosure.
Figure 6B:
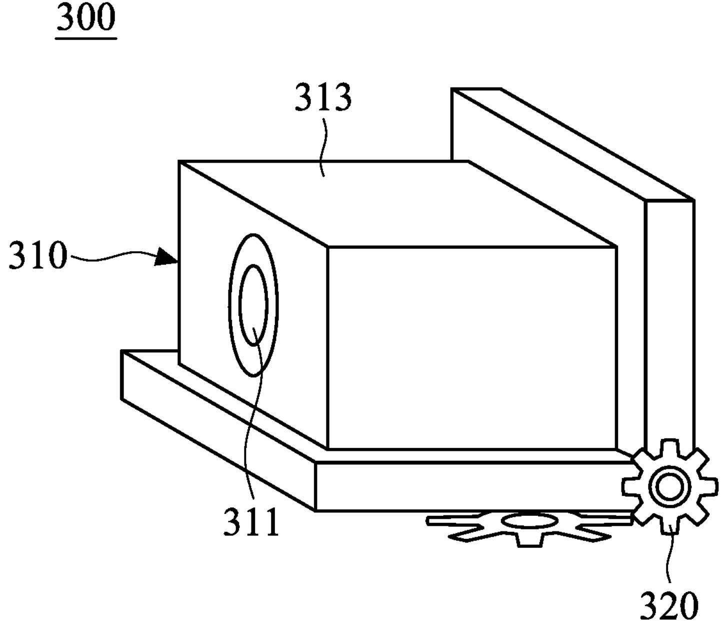
FIG. 6B is a schematic diagram of the camera module according to another embodiment of the disclosure.

FIG. 6A is a schematic diagram of the photographic system S according to another embodiment of the disclosure, and FIG. 6B is a schematic diagram of the camera module 300 of the photographic system S in FIG. 6A. As shown in FIG. 6A and FIG. 6B, in this embodiment, the host 100, the infrared sensor 200, and the environment light sensor 400 are disposed in a first housing 500. The environment light sensor 400 can be disposed as required. In this embodiment, the environment light sensor 400 can be also omitted. The camera 310 includes a visible spectrum camera 311, and the visible spectrum camera 311 is disposed in a second housing 313. The camera 310 is disposed on the controller 320. The controller 320 can drive the second housing 313 of the camera 310 to move (such as rotate or shift), so that the visible spectrum camera 311 in the second housing 313 can be driven to move to adjust the photographing direction of the camera 310. Since the second housing 313 is disposed in the first housing 500 and the second housing 313 is driven by the controller 320, the camera 310 and the infrared sensor 200 can be simultaneously move when the controller 320 adjust the photographing direction of the camera 310. In another embodiment, the infrared sensor 200 and the camera module 300 are disposed in different housings that are enabled to move independently and do not interfered with each other. Thus, when the controller 320 adjusts the photographing direction of the camera 310, the camera 310 moves relative to the infrared sensor 200.

In this embodiment, the photographic system S further includes a flash 600 disposed on the first housing 500 and electrically connected to the host 100. The host 100 can determine that whether the flash 600 is open according to the light detected by the environment light sensor 400 and the position of the target object.

Since the camera 310 in this embodiment merely includes the visible spectrum camera 311, the dimensions and the weight of the photographic system S can be reduced, and the miniaturization of the photographic system S can be facilitated.

Figure 7:
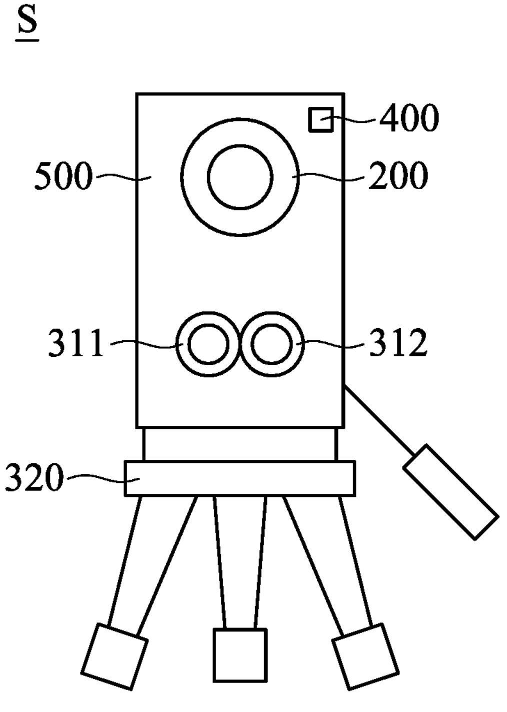
FIG. 7 is a schematic diagram of the photographic system according to another embodiment of the disclosure.

Referring to FIG. 7, in another embodiment, the host 100, the infrared sensor 200, the environment light sensor 400, and the camera 310 (including the visible spectrum camera 311 and the near-infrared camera 312) of the camera module 300 are disposed in a first housing 500, and the controller 320 of the camera module 300 is disposed outside the first housing 500 and connected to the first housing 500. For example, the controller 320 can be an adjustable tripod. The host 100 can control the adjustable tripod to let the adjustable tripod deforming, so as to shift or rotate the first housing 500, and the photographing direction of the camera 310 can be therefore changed. Since the controller 320 in this embodiment is drive the first housing 500 to move, the camera 310 and the infrared sensor 200 can be simultaneously move when the controller 320 adjust the photographing direction of the camera 310.

The host 100 can transmit signal to the adjustable tripod (the controller 320) in a wireless manner to let the adjustable tripod deforming. Otherwise, the host 100 can be connected to the adjustable tripod via the wire. That is, the host 100 can be connected to the controller 320 by wiring.

The features between the aforementioned embodiments can be used or combined as long as they do not violate or conflict the spirit of the present application.

In summary, an embodiment of the disclosure provides a photographic system for photographing a warm-blooded animal in a background. The photographic system includes an infrared sensor, a host, and a camera module. The infrared sensor is configured to identify the position of the warm-blooded animal in the background, and generate position data according to the position. The host is coupled to the infrared sensor, and configured to receive the position data and generate at least one parameter according to the position data. The camera module is coupled to the host, and includes a camera and a controller. The controller is configured to receive the parameter and adjust the photographing direction of the camera according to the parameter.

An embodiment of the disclosure also provides an operation method of a photographic system. The operation method includes providing the photographic system, wherein the photographic system comprises an infrared sensor, a host, and a camera module, and the host is coupled to the infrared sensor and the camera module. The operation method includes using the infrared sensor to identify that whether a heating object is existed in a background. The operation method includes using the infrared sensor to determine that whether the heating object is a target object to be photographed. The operation method includes using the infrared sensor to generate position data when the target object is in the background and transmit the position data to the host. The operation method includes using the host to generate at least one parameter according to the position data and transmit the at least one parameter to the controller of the camera module. The operation method includes using the controller to adjust the camera in the camera module to align the camera's field of view to the target object. The operation method includes using the camera to focus and then take a photograph.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An operation method of a photographing system, comprising:

providing the photographing system, wherein the photographing system comprises an infrared sensor, a host, and a camera module, and the host is coupled to the infrared sensor and the camera module;

adjusting a center of a field of view of the infrared sensor and a center of a field of view of the camera module to the same coordinate;

using the infrared sensor to identify that whether a heating object is existed in a background;

using the infrared sensor to determine that whether the heating object is a target object to be photographed;

using the infrared sensor to generate a position data when the target object is in the background and transmit the position data to the host;

using the host to generate at least one parameter according to the position data and transmit the at least one parameter to a controller of the camera module;

using the controller to adjust a camera of the camera module to align a field of view of the camera to the target object; and using the camera to focus and photograph.

2. The operation method as claimed in claim 1, wherein the photographic system further comprises an environment light sensor, and the operation method further comprises:

before the step of using the infrared sensor to identify that whether the heating object is existed in the background, using the environment light sensor to detect a lightness of the background.

3. The operation method as claimed in claim 2, wherein the camera comprises a visible spectrum camera and a near-infrared camera, wherein when the light detected by the environment light sensor is sufficient, the host chooses the visible spectrum camera to photograph, wherein when the light detected by the environment light sensor is insufficient, the host chooses the near-infrared camera to photograph.

4. The operation method as claimed in claim 1, wherein the at least one parameter includes an orientation angle, an elevation angle, a dip angle, or a combination thereof.

* * * * *